(12) United States Patent
Okada et al.

(10) Patent No.: US 9,810,576 B2
(45) Date of Patent: Nov. 7, 2017

(54) VARIABLE WAVELENGTH OPTICAL FILTER MODULE

(71) Applicant: Panasonic Intellectual Property Management Co., Ltd., Osaka (JP)

(72) Inventors: Mitsuhiro Okada, Hyogo (JP); Soichiro Hiraoka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/026,989

(22) PCT Filed: Dec. 12, 2014

(86) PCT No.: PCT/JP2014/006190
§ 371 (c)(1),
(2) Date: Apr. 4, 2016

(87) PCT Pub. No.: WO2015/098019
PCT Pub. Date: Jul. 2, 2015

(65) Prior Publication Data
US 2016/0258812 A1     Sep. 8, 2016

(30) Foreign Application Priority Data

Dec. 27, 2013   (JP) .................. 2013-271263

(51) Int. Cl.
*G01J 3/26* (2006.01)
*G01J 3/02* (2006.01)
*G02B 26/00* (2006.01)

(52) U.S. Cl.
CPC .............. *G01J 3/26* (2013.01); *G01J 3/021* (2013.01); *G01J 3/0205* (2013.01); *G01J 3/0259* (2013.01); *G02B 26/001* (2013.01)

(58) Field of Classification Search
CPC .. G01J 3/26; G01J 3/0205; G01J 3/021; G01J 3/0259; G01J 1/4257; G02B 26/001;
(Continued)

(56) References Cited

U.S. PATENT DOCUMENTS 5,550,373 A * 8/1996 Cole ................... G01J 3/02
                                                    250/338.1
6,618,199 B2 * 9/2003 Cook ................. G01J 3/26
                                                    359/577

(Continued)

FOREIGN PATENT DOCUMENTS

| JP | 10-511772 | 11/1998 |
| JP | 2008-151544 | 7/2008 |
| JP | 2009-270959 | 11/2009 |

OTHER PUBLICATIONS

International Search Report of PCT application No. PCT/JP2014/006190 dated Feb. 3, 2015.

*Primary Examiner* — Tarifur Chowdhury
*Assistant Examiner* — Mohamed K Amara
(74) *Attorney, Agent, or Firm* — McDermott Will & Emery LLP

(57) ABSTRACT

A variable wavelength optical filter module according to the present invention includes a package, a variable wavelength optical filter, and a detector. The package includes a reflection part (reflecting faces) in the inside of the package. The variable wavelength optical filter is disposed in the inside of the package and includes a first reflecting plate and a second reflecting plate facing each other, with a clearance between the first reflecting plate and the second reflecting plate being variable. The detector is disposed in the inside of the package and detects a ray of light having passed through the variable wavelength optical filter. Then, the variable wavelength optical filter and the detector are disposed on the opposite side to the reflection part (reflecting faces). The ray (Continued)

of the light incident into the inside of the package via the variable wavelength optical filter enters the detector via the reflection part (reflecting faces).

9 Claims, 5 Drawing Sheets

(58) Field of Classification Search
CPC . G01M 11/0278; G01M 11/005; B82Y 20/00; H01L 31/02168; H01L 31/056; H01L 31/02327; Y02E 10/52
See application file for complete search history.

(56) References Cited

U.S. PATENT DOCUMENTS

| | | | | |
|---|---|---|---|---|
| 6,763,718 B1* | 7/2004 | Waters | ............... | G01P 15/093 356/506 |
| 7,145,143 B2* | 12/2006 | Wood | ............... | G01B 11/272 250/339.04 |
| 7,911,623 B2* | 3/2011 | Lin | ............... | G01J 3/02 356/454 |
| 8,040,588 B2* | 10/2011 | Chui | ............... | G02B 26/001 359/247 |
| 8,045,252 B2* | 10/2011 | Chui | ............... | G02B 26/001 359/238 |
| 8,115,987 B2* | 2/2012 | Bita | ............... | G02B 26/001 359/291 |
| 8,405,899 B2* | 3/2013 | Chui | ............... | G02B 26/001 359/223.1 |
| 9,285,390 B2* | 3/2016 | Meyer | ............... | G01P 15/093 |
| 9,348,034 B2* | 5/2016 | Tredwell | ............... | G01T 1/20 |
| 9,518,917 B2* | 12/2016 | Scherer | ............... | G01N 21/3577 |
| 9,588,333 B2* | 3/2017 | Sano | ............... | G02B 26/001 |
| 2004/0051763 A1* | 3/2004 | Matsubara | ............... | B41J 2/14233 347/68 |
| 2004/0066477 A1* | 4/2004 | Morimoto | ............... | G02F 1/133555 349/113 |
| 2005/0134962 A1* | 6/2005 | Verghese | ............... | G01J 3/26 359/579 |
| 2005/0224694 A1* | 10/2005 | Yaung | ............... | H01L 27/1462 250/208.1 |
| 2006/0132383 A1* | 6/2006 | Gally | ............... | G02B 26/001 345/32 |
| 2009/0306479 A1 | 12/2009 | Kamihara | | |
| 2010/0211333 A1 | 8/2010 | Pruet et al. | | |
| 2011/0280042 A1* | 11/2011 | Pance | ............... | H03G 3/32 362/606 |
| 2013/0181114 A1* | 7/2013 | Egawa | ............... | H01L 27/14629 250/208.1 |
| 2014/0002802 A1* | 1/2014 | Hsu | ............... | G02B 17/08 353/69 |
| 2014/0333998 A1* | 11/2014 | Kohli | ............... | G02B 21/02 359/391 |
| 2015/0253469 A1* | 9/2015 | Le Gros | ............... | G02B 3/0006 359/619 |
| 2015/0340397 A1* | 11/2015 | Seo | ............... | H01L 27/14627 257/432 |
| 2015/0345729 A1* | 12/2015 | Liao | ............... | F21S 48/125 362/510 |
| 2016/0229165 A1* | 8/2016 | Choi | ............... | G02B 1/11 |

\* cited by examiner

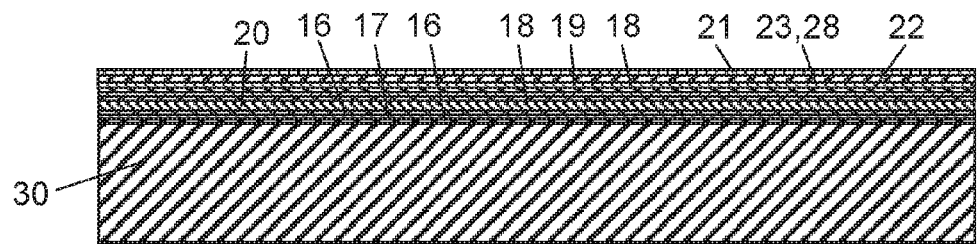
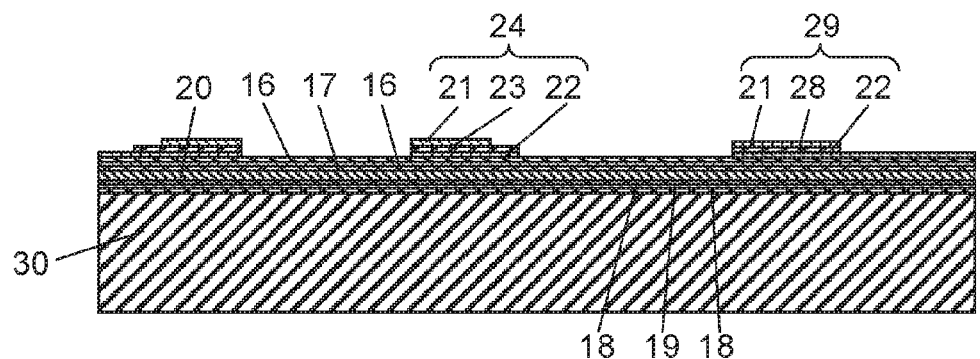
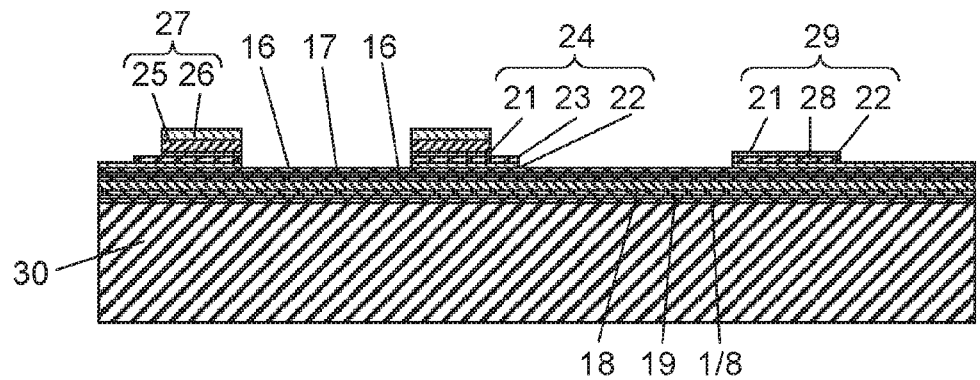
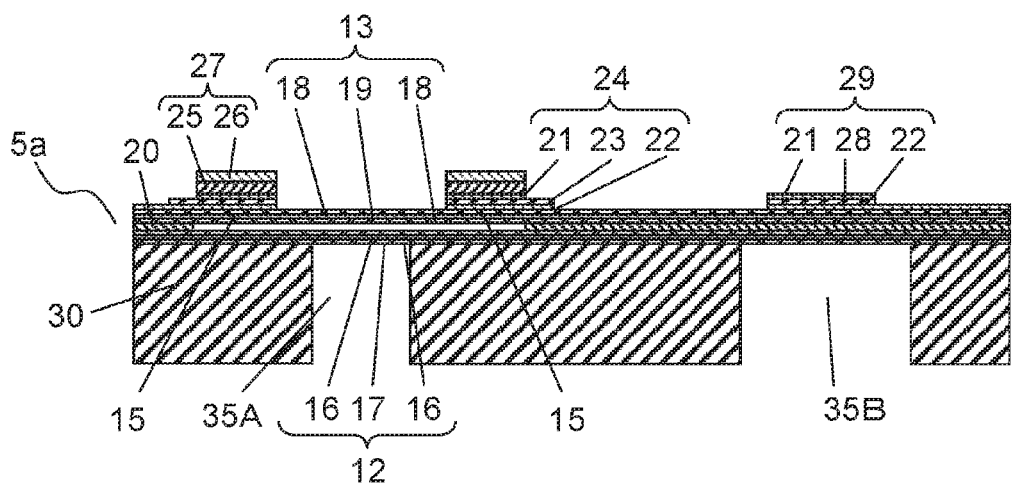

VARIABLE WAVELENGTH OPTICAL FILTER MODULE

CROSS-REFERENCE TO RELATED APPLICATIONS

This application is a U.S. national stage application of the PCT International Application No. PCT/JP2014/006190 filed on Dec. 12, 2014, which claims the benefit of foreign priority of Japanese patent application 2013-271263 filed on Dec. 27, 2013, the contents all of which are incorporated herein by reference.

TECHNICAL FIELD

The present invention relates to variable wavelength optical filter modules which each detect a ray of light having a predetermined wavelength by selectively transmitting the lay therethrough.

BACKGROUND ART

Conventionally, this type of variable wavelength optical filter module has been known to have the following structure. That is, a variable wavelength optical filter is used which can transmit a ray of light having a specific wavelength, via interference action when an incident light is subjected to multiple reflection between a pair of reflecting plates. Then, a small clearance between the pair of the reflecting plates of the variable wavelength optical filter is displaced to vary the wavelength of the light being transmitted through it. Then, the transmitted light is detected with a detector.

Examples of application of conventional variable wavelength optical filter modules include: multi-gas sensors for sensing kinds of gases by using mid-infrared rays, and sensors for sensing urine glucose levels or a blood glucose levels by using near-infrared rays.

Note that, in the conventional variable wavelength optical filter module, there are arranged a light source to emit a ray of light, the variable wavelength optical filter, and the detector, on a straight line along the optical axis of the light source.

Note that prior art documents relating to the invention of the present application have been known, including Patent Literature 1, for example.

CITATION LIST

Patent Literature

PTL 1: Japanese Translation of PCT Publication No. H10-511772

SUMMARY OF THE INVENTION

In a conventional variable wavelength optical filter module, its variable wavelength optical filter and detector are disposed on a line along a light. This causes the variable wavelength optical filter and the detector to be treated as separate bodies. As a result, such a configuration has required an increase in the number of steps of manufacturing the variable wavelength optical filter module, resulting in a problem of productivity.

An object of the present invention is to solve such a problem and to increase the productivity of variable wavelength optical filter modules.

In order to achieve the object, a variable wavelength optical filter module according to the present invention includes a package, a variable wavelength optical filter, and a detector. The package includes a reflection part in the inside of the package. The variable wavelength optical filter is disposed in the inside of the package, and includes a first reflecting plate and a second reflecting plate facing each other, with a clearance between the first reflecting plate and the second reflecting plate being variable. The detector is disposed in the inside of the package, and detects a ray of light having passed through the variable wavelength optical filter. Then, both the variable wavelength optical filter and the detector are disposed on the opposite side to the reflection part. The ray of the light incident into the inside of the package via the variable wavelength optical filter enters the detector via the reflection part.

This configuration allows an increased productivity of the variable wavelength optical filter modules.

BRIEF DESCRIPTION OF DRAWINGS

FIG. 5A is a schematic view illustrating a method of manufacturing a first block of the variable wavelength optical filter module according to the embodiment.

FIG. 5B is a schematic view illustrating the method of manufacturing the first block of the variable wavelength optical filter module according to the embodiment.

FIG. 5C is a schematic view illustrating the method of manufacturing the first block of the variable wavelength optical filter module according to the embodiment.

FIG. 5D is a schematic view illustrating the method of manufacturing the first block of the variable wavelength optical filter module according to the embodiment.

DESCRIPTION OF EMBODIMENTS

Exemplary Embodiment

Configuration of Variable Wavelength Optical Filter Module

Figure 1:
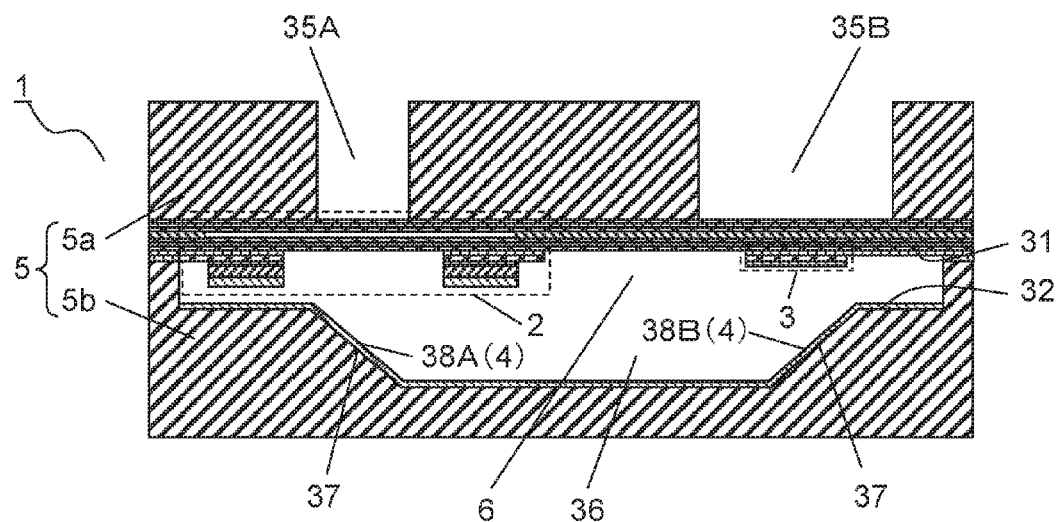
FIG. 1 is a cross-sectional view of a variable wavelength optical filter module according to an embodiment of the present invention.

Hereinafter, embodiments of the present invention will be described with reference to the accompanying drawings. FIG. 1 is a cross-sectional view of variable wavelength optical filter variable wavelength optical filter module 1. First, a basic structure of variable wavelength optical filter module 1 is described.

Package 5 is configured with first block 5a (first region) and second block 5b (second region). Then, package 5 includes internal space G. Variable wavelength optical filter 2 and detector 3 are disposed in the inside of the package. In package 5, second block 5b includes inclined face 37. On the surface of inclined face 37, reflecting faces 38A and 38B (reflection part) are formed. Reflecting faces 38A and 38B function as optical-path adjusting part 4.

Next, an optical path of light incident on variable wavelength optical filter module 1 according to the embodiment will be described.

Figure 2:
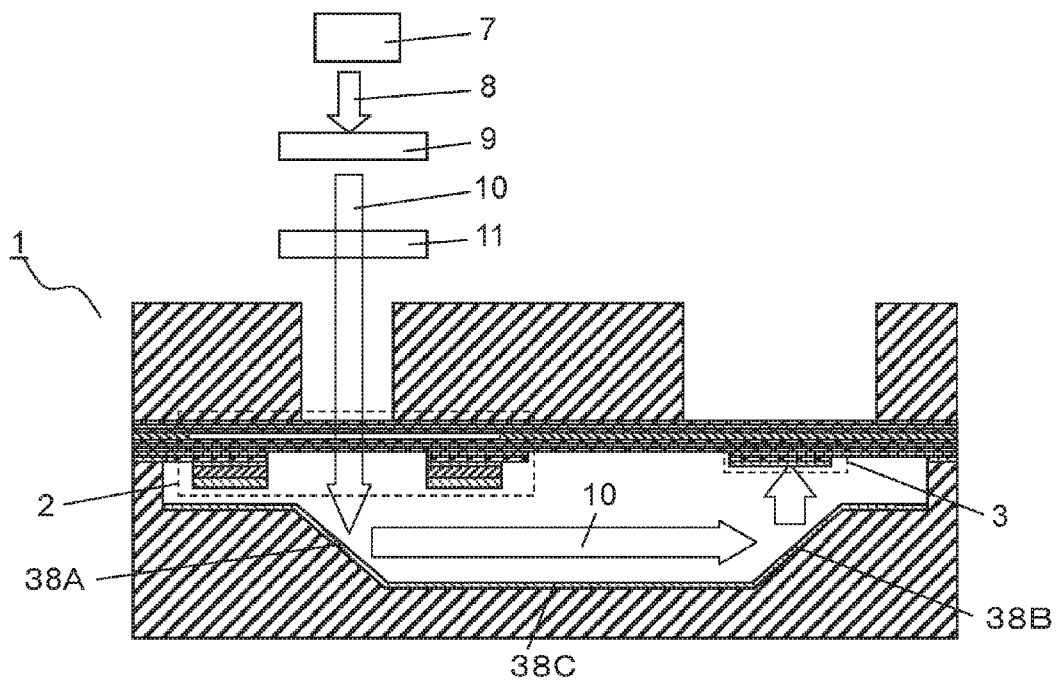
FIG. 2 is a schematic view illustrating a principle of measurement with the variable wavelength optical filter module according to the embodiment of the invention.

As shown in FIG. 2, parallel ray 8 of light emitted from light source 7 is applied onto measuring object 9. Then, transmitted light 10 passes through band-pass filter 11 and variable wavelength optical filter 2 to enter the inside of package 5. The light having entered the inside of package 5 is reflected off reflecting face 38A (reflection part) and reflecting face 38B (reflection part) in this order, and is then received by detector 3.

Note that a spectral measurement is carried out in such a manner that variable wavelength optical filter 2 selects the wavelength of transmitted light 10 and detector 3 measures the quantity of the transmitted light.

Details of Configuration of Variable Wavelength Optical Filter 2

Figure 3:
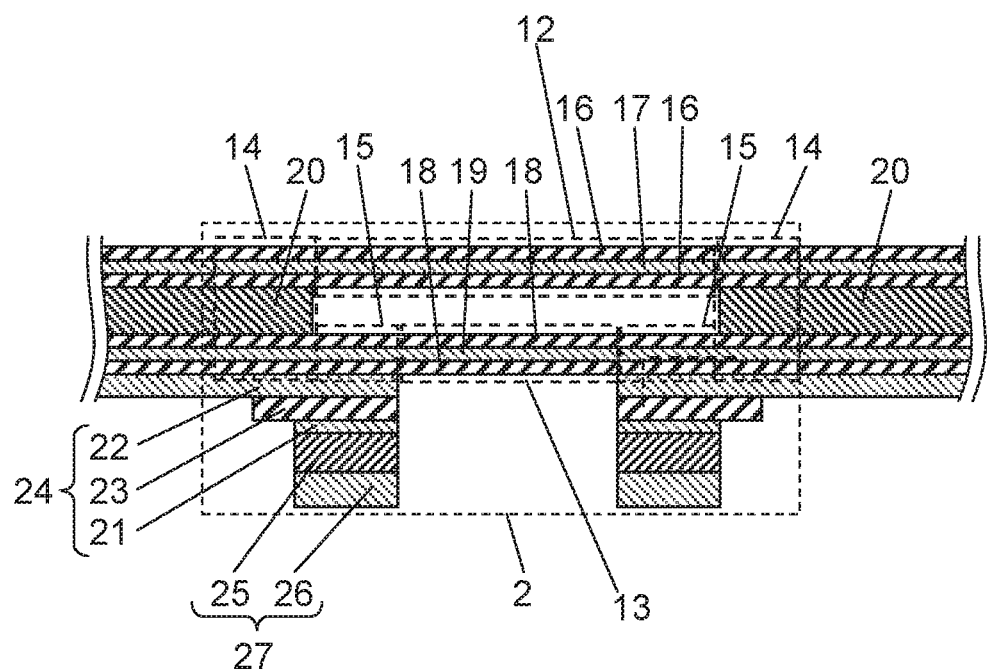
FIG. 3 is a cross-sectional view of a variable wavelength optical filter of the variable wavelength optical filter module according to the embodiment.

Variable wavelength optical filter 2 includes two reflecting plates 12 and 13 which are disposed to face each other, as shown in FIG. 3. The end part of reflecting plate 12 is supported by frame 14. The end part of reflecting plate 13 is supported by frame 14 via beam 15.

Note that reflecting plate 12 has a three-layer structure in which silicon nitride layer 17 is disposed between amorphous silicon layers 16. In the same manner as for reflecting plate 12, reflecting plate 13 also has a three-layer structure in which silicon nitride layer 19 is disposed between amorphous silicon layers 18. Frame 14 has a seven-layer structure which is configured including: extension parts of both left/right sides of reflecting plates 12 and 13, and silicon oxide layer 20 disposed between the extension parts.

On the surface (lower surface) of beam 15, drive layer 24 is disposed. Drive layer 24 is configured such that piezoelectric layer 23 is disposed between electrode 21 (first electrode) and electrode 22 (second electrode). Drive layer 24 is such that a drive voltage is applied to electrode 21 (first electrode) from a control circuit (not shown) via a connection terminal (not shown). Upon application of the drive voltage to electrode 21, a potential difference occurs between electrodes 21 and 22. In accordance with the potential difference, piezoelectric layer 23 deflects. This deflection causes reflecting plate 13 to be displaced toward the direction (up-and-down direction in the Figure) facing reflecting plate 12. That is, the clearance between the pair of reflecting plates 12 and 13 can be freely adjusted by adjusting the magnitude of the drive voltage that is applied to drive layer 24 disposed on beam 15.

Note that, on the surface of drive layer 24, vibration part 27 is disposed which is configured with elastic insulating layer 25 and metal layer 26. Vibration part 27 restrains drive layer 24 from being displaced, thereby allowing beam 15 to offer a large deflection.

Configuration of Detector 3

Figure 4:
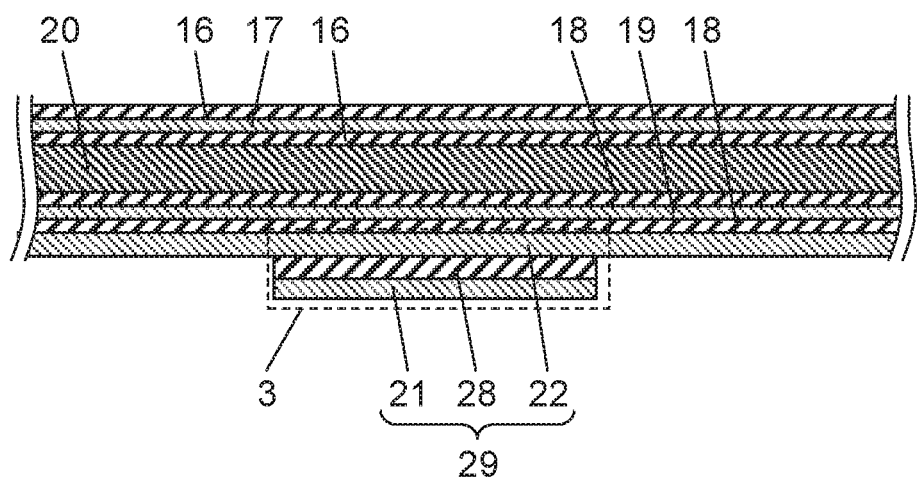
FIG. 4 is a cross-sectional view of a detector of the variable wavelength optical filter module according to the embodiment.

Detector 3 is configured with detection layer 29, as shown in FIG. 4, in which pyroelectric layer 28 is disposed between electrode 21 and electrode 22. Detection layer 29 is disposed on the surface of the extension part of frame 14 of variable wavelength optical filter 2 described above. The extension part is the seven-layer structure body that is configured with the layers including: amorphous silicon layers 16 and silicon nitride layer 17 which configure reflecting plate 12; amorphous silicon layers 18 and silicon nitride layer 19 which configure reflecting plate 13; and silicon oxide layer 20 disposed between these reflecting plates.

Configuration of Package 5

Next, a further detailed description of the internal configuration of package 5 will be made with reference to FIG. 1.

As shown in FIG. 1, package 5 is a hollow structure body having internal space 6. Variable wavelength optical filter 2 and detector 3 are disposed in a planar manner on first plane 31 that defines internal space 6, with the first plane being on the upper side in the Figure. In package 5, opening 35A is formed in a portion which serves as an incident optical path to variable wavelength optical filter 2; opening 35B is formed in a portion, in proximity to the back side of detector 3, where thermal diffusion of detector 3 is prevented.

Note that, although opening 35A is formed in variable wavelength optical filter module 1 according to the embodiment, opening 35A is not necessarily formed if the optical path is formed with an optically transparent material such as glass. This does not matter as long as light is allowed to enter variable wavelength optical filtervariable wavelength optical filter 2.

Moreover, although opening 35B is intended to prevent thermal diffusion of detector 3, the formation of the opening is not always necessary.

Moreover, in second block 5b of package 5, recess 36 is formed. Inclined face 37 is a part of side surfaces of recess 36. On the surface of inclined face 37, reflecting faces 38A and 38B are formed. Then, reflecting faces 38A and 38B serve as optical path adjusting part 4.

Next, the optical path of light travelling the inside of package 5 will be described.

In variable wavelength optical filter module 1, as shown in FIG. 2, transmitted light 10, i.e. the incident light, is subjected to multiple reflection between reflecting plates 12 and 13, which causes resonance of only light having a wavelength which satisfies the interference condition determined by the small clearance between reflecting plates 12 and 13 (see FIG. 3). Then, only the light having the resonance wavelength can pass through reflecting plates 12 and 13 (see FIG. 3). As described above, reflecting plate 13 of variable wavelength optical filter 2 is sequentially moved to vary the small clearance, thereby selecting the wavelength of transmitted light 10 emitted from reflecting plate 13. Transmitted light 10 output from variable wavelength optical filter 2 is reflected off optical-path adjusting part 4 (reflecting faces 38A and 38B) to enter detector 3. Detector 3 measures the quantity of the transmitted light, thereby measuring the spectrum.

More specifically, a chive signal is applied to drive layer 24 to control the clearance between reflecting plates 12 and 13 within a range of 350 nm to 1.5 μm. Then, the first-order interference condition makes it possible to take light having any wavelength in a near infrared region (700 nm to 3.0 μm) out of transmitted light 10 having various wavelengths. In this case, detector 3 having sensitivity in a desired wavelength region is combined with band-pass filter 11 which can remove light having unnecessary wavelengths that would be selected under other-orders interference conditions. Such a combination is of a simple parts-structure which allows spectra to be measured over the near infrared region. Note that, although the interference condition has been exemplified by the first-order interference condition as an example, another-order interference condition may be used.

Method of Manufacturing Variable Wavelength Optical Filter Module 1

Next, descriptions will be made regarding a method of manufacturing variable wavelength optical filter module 1 according to the embodiment of the present invention, with reference to FIGS. 5A to 6C.

Note that, in the embodiment, package 5 has a junction structure of first block 5a and second block 5b. First block 5a includes first block 5a in which variable wavelength optical filter 2 and detector 3 are disposed on first plane 31. Moreover, second block 5b of package 5 configures optical-path adjusting part 4.

Method of Manufacturing First Block 5a

First, a method of manufacturing first block 5a will be described.

As shown in FIG. 5A, on one side of substrate 30 made of silicon, amorphous silicon layers 16, silicon nitride layer 17, and amorphous silicon layers 16 are formed in this order. Note that these layers are to configure reflecting plate 12 and a part of frame 14.

Next, on amorphous silicon layers 16, silicon oxide layer 20 is formed. Note that the layer will configure a part of frame 14 and a sacrificial layer.

Moreover, on silicon oxide layer 20, amorphous silicon layers 18, silicon nitride layer 19, and amorphous silicon layers 18 are formed in this order. Note that these layers are to configure reflecting plate 13, a part of frame 14, and beam 15.

Furthermore, on amorphous silicon layers 18, electrode 22, either piezoelectric layer 23 or pyroelectric layer 28, and electrode 21 are laminated in this order by sputtering or the like. Electrode 22 is formed of platinum; piezoelectric layer 23 and pyroelectric layer 28 are formed of lead zirconate titanate; electrode 21 is formed of gold.

Next, a part of each of electrode 22 (platinum), either piezoelectric layer 23 or pyroelectric layer 28 (lead zirconate titanate), and electrode 21 (gold) is removed by ICP dry-etching, thereby patterning drive layer 24 and detection layer 29, as shown in FIG. 5B.

In addition, as shown in FIG. 5C, vibration part 27 is formed on the surface of a portion which will become drive layer 24 of variable wavelength optical filter 2. On electrode 21, elastic insulating layer 25 is formed which is composed of an insulating material that can undergo a photo-cross-linking reaction. Furthermore, on the upper surface of elastic insulating layer 25, metal layer 26 composed of copper is formed by electroplating. Thus, vibration part 27 is configured with elastic insulating layer 25 and metal layer 26.

Next, silicon oxide layer 20 located beneath reflecting plate 13 and beam 15 is removed by using hydrogen fluoride. Of the sacrificial layer, silicon oxide layer 20 corresponding to frame 14 is not removed.

Moreover, portions of substrate 30 corresponding to the back sides of reflecting plate 12 and detection layer 29 are removed to form openings 35A and 35B. As described above, this completes first block 5a as shown in FIG. 5D.

Method of Manufacturing Second Block 5b

Figure 6A:
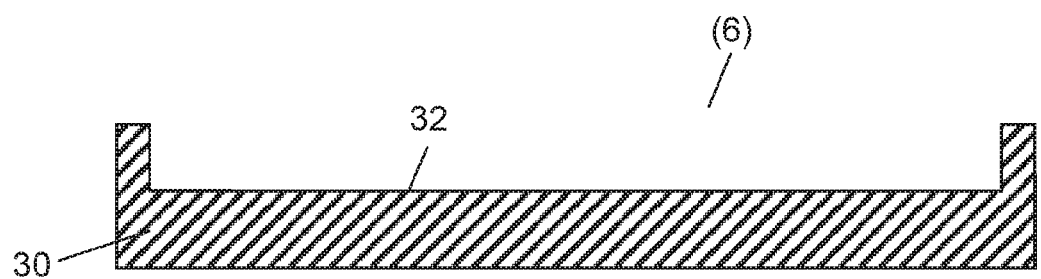
FIG. 6A is a schematic view illustrating method of manufacturing a second block of the variable wavelength optical filter module according to the embodiment.
Figure 6B:
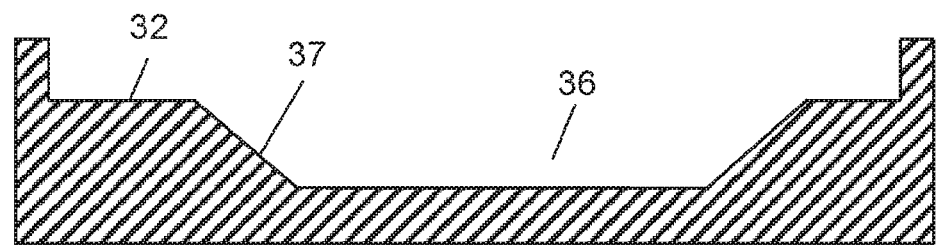
FIG. 6B is a schematic view illustrating the method of manufacturing the second block of the variable wavelength optical filter module according to the embodiment.
Figure 6C:
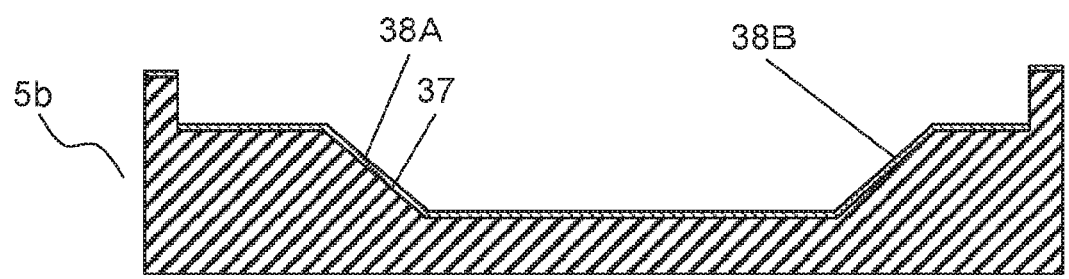
FIG. 6C is a schematic view illustrating the method of manufacturing the second block of the variable wavelength optical filter module according to the embodiment.

Next, a method of manufacturing second block 5b will be described. As shown in FIG. 6A, silicon substrate 30 which configures second block 5b is dry-etched to form side wall portions and second plane 32 which are to define internal space 6. Next, as shown in FIG. 6B, recess 36 is formed in second plane 32 by wet-etching. In recess 36, inclined face 37 is formed. Next, as shown in FIG. 6C, the surfaces (second plane 32, inclined face 37, etc.) of second block 5b are coated with gold by sputtering, vapor deposition, or the like to form reflecting faces 38A and 38B. This completes second block 5b.

Figure 7:
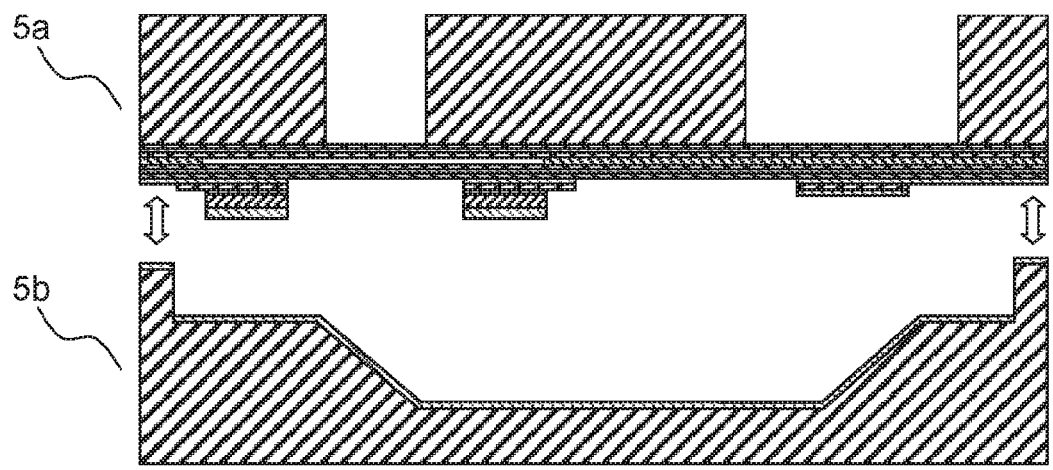
FIG. 7 is a schematic view illustrating a method of joining the first block and the second block according to the embodiment.

Finally, as shown in FIG. 7, the platinum of the extension part of electrode 22 exposed from the peripheral part of first block 5a is joined to the gold of the extension parts of reflecting faces 38A and 38B of second block 5b, thereby integrating first block 5a and second block 5b into a one body. This completes package 5.

As described above, on the surface of first block 5a (first region) of internal space 6 of package 5, variable wavelength optical filter 2 and detector 3 are disposed. Moreover, on the surface of second block 5b (second region) of internal space 6 of package 5, the reflection part (reflecting face 38) is formed which functions as optical-path adjusting part 4. This allows the configuration to be separated into the blocks, that is, first block 5a which includes variable wavelength optical filter 2 and detector 3 and second block 5b which includes optical-path adjusting part 4. Then, variable wavelength optical filter 2 and detector 3 are formed as first block 5a; optical-path adjusting part 4 is formed as second block 5b. After that, first block 5a and second block 5b are joined to each other. Thus, variable wavelength optical filter module 1 according to the embodiment can be manufactured by the method described above. As a result, a high alignment accuracy can be achieved among variable wavelength optical filter 2, optical-path adjusting part 4, and detector 3, by the semiconductor processing which features highly accurate assembling, resulting in an increased productivity of variable wavelength optical filter module 1. Moreover, the whole of variable wavelength optical filter module 1 can be formed in an MEMS structure by the semiconductor processing, which allows a reduction in the profile of variable wavelength optical filter module 1.

Moreover, in the embodiment, lead zirconate titanate is used to form both piezoelectric layer 23 which configures drive layer 24 of variable wavelength optical filter 2 and pyroelectric layer 28 which configures detection layer 29 of detector 3. The use of the same material for piezoelectric layer 23 and pyroelectric layer 28 allows both to be formed by the same process, resulting in an increased productivity.

Note that, in the embodiment, the descriptions have been made by using lead zirconate titanate as the material of piezoelectric layer 23 and pyroelectric layer 28; however, the material is not limited to it. The following material can be used for both piezoelectric layer 23 and pyroelectric layer 28, and bring about the same effects as those of lead zirconate titanate. That is, such a material is a perovskite oxide having a single crystal structure (or uniaxially-oriented crystal structure) expressed by $ABO_3$ where A-site contains Pb as a chief component and B-site contains elements of Zr and Ti. This material also exhibits a crystal phase selected from a tetragonal phase and a rhombohedral phase, with the crystal phase having a <100/001> orientation.

Note that, in the embodiment, as shown in FIG. 2, transmitted light 10 enters detector 3, after having been reflected off the two places, i.e. reflecting face 38A and reflecting face 38B, in the inside of package 5. That is, the reflection part is configured with reflecting face 38A and reflecting face 38B. However, the number of the reflecting faces is not limited to two.

For example, a three-reflecting-faces structure is possible in which reflecting face 38C (see FIG. 2) is additionally disposed on the bottom surface of recess 36 located between two reflecting faces 38A and 38B, with the angles of inclination of reflecting faces 38A and 38B being made smaller. Such a smaller angle of inclination of inclined face 37, on which the reflection part including reflecting face 38A and the like is formed, increases the ease of wet-etching, resulting in an increased productivity.

In the embodiment, the descriptions have been made by using the configuration in which the reflection part including reflecting face 38A and the like is formed on inclined face 37 of recess 36. However, although not particularly shown in the Figures, the configuration may be such that inclined face 37 is formed to protrude into internal space 6 and the reflection part is disposed on inclined face 37.

Moreover, in the embodiment described above, the descriptions have been made by using the case where the piezoelectric actuation system using piezoelectric layer 23 is adopted as a means for varying the clearance between reflecting plates 12 and 13 in variable wavelength optical filter 2. However, other commonly-known actuation systems, such as an electrostatic actuation system and an electromagnetic actuation system, may be used to offer the same advantageous effects. Among others, however, the piezoelectric actuation system deserves a special note. That is, the piezoelectric actuation system is one in which beam 15 is directly deformed by expansion-contraction of piezoelectric layer 23, which brings about advantages of a larger displacement of reflecting plate 13 and an increased displacement response of reflecting plate 13, over the electrostatic and electromagnetic actuation systems described above.

INDUSTRIAL APPLICABILITY

The present invention allows an improved productivity of variable wavelength optical filter modules which each selectively transmit light having a predetermined wavelength and detect it. The technology according to the invention is useful particularly for variable wavelength optical filter modules which use mid-infrared rays or near-infrared rays.

REFERENCE MARKS IN THE DRAWINGS

1 variable wavelength optical filter module
2 variable wavelength optical filter
3 detector
4 optical-path adjusting part
5 package
5a first block
5b second block
6 internal space
7 light source
8 parallel ray
9 measuring object
10 transmitted light
11 band-pass filter
12, 13 reflecting plate
14 frame
15 beam
16, 18 amorphous silicon layer
17, 19 silicon nitride layer
20 silicon oxide layer
21, 22 electrode
23 piezoelectric layer
24 drive layer
25 elastic insulating layer
26 metal layer
27 vibration part
28 pyroelectric layer
29 detection layer
31 first plane
32 second plane
35A, 35B opening
36 recess
37 inclined face
38A, 38B, 38C reflecting face

The invention claimed is:

1. A variable wavelength optical filter module, comprising:
   a package including a first reflection part disposed in an inside of the package;
   a variable wavelength optical filter disposed in the inside of the package and including a first reflecting plate and a second reflecting plate facing each other with a variable clearance therebetween; and
   a detector disposed in the inside of the package, for detecting a ray of light passing through the variable wavelength optical filter, wherein:
   the variable wavelength optical filter and the detector are disposed on an opposite side to the first reflection part, and
   the ray of the light incident is entered from an upper side of the package into the inside of the package through the variable wavelength optical filter,
   the first reflection part reflects the ray of the light incident passing through the variable wavelength optical filter, and
   the ray of the light incident reflected from the first reflection part enters the detector.

2. The variable wavelength optical filter module according to claim 1, wherein:
   the package includes a first region and a second region,
   the first region is provided in the upper side of the second region,
   the variable wavelength optical filter and the detector are disposed in the first region, and
   the first reflection part is formed in the second region.

3. The variable wavelength optical filter module according to claim 1,
   wherein the variable wavelength optical filter includes a piezoelectric layer for varying the clearance between the first reflecting plate and the second reflecting plate, and
   the detector includes a pyroelectric layer for detecting the ray of the light.

4. The variable wavelength optical filter module according to claim 3, wherein the piezoelectric layer and the pyroelectric layer are formed of an identical material.

5. The variable wavelength optical filter module according to claim 3, wherein the piezoelectric layer and the pyroelectric layer are each a perovskite oxide, the oxide having either a single crystal structure or an uniaxially-oriented crystal structure.

6. The variable wavelength optical filter module according to claim 1,
   wherein the variable wavelength optical filter further includes:
   a frame for supporting the first reflecting plate;
   a beam for coupling the second reflecting plate to the frame; and
   a drive layer configured with:
   a first electrode;
   a second electrode; and
   a piezoelectric layer disposed between the first electrode and the second electrode, and
   the drive layer is disposed on a surface of the beam.

7. The variable wavelength optical filter module according to claim 1,
   wherein the package includes a plurality of inclined faces in the inside of the package, and
   the first reflection part is disposed on a surface of the inclined faces.

8. The variable wavelength optical filter module according to claim 7,
   wherein the package includes a recess in the inside of the package, and
   the plurality of the inclined faces is part of side surfaces of the recess.

9. The variable wavelength optical filter module according to claim 8, further comprising a second reflection part,
   wherein the second reflection part is disposed in a bottom surface of the recess.

* * * * *